United States Patent [19]

Kelley

[11] Patent Number: 4,685,255

[45] Date of Patent: Aug. 11, 1987

[54] WORK SPACE MANAGEMENT SYSTEM

[75] Inventor: James O. Kelley, Spring Lake, Mich.

[73] Assignee: Herman Miller, Inc., Zeeland, Mich.

[21] Appl. No.: 648,900

[22] Filed: Sep. 10, 1984

[51] Int. Cl.[4] .......................... A47B 5/02; E04F 19/06; H02G 3/00; H02G 3/06

[52] U.S. Cl. .......................................... 52/36; 52/221; 174/48; 439/209

[58] Field of Search .................... 52/36, 221, 220, 239, 52/238.1, 243; 174/48, 49; 339/20, 21 R, 22 R

[56] References Cited

U.S. PATENT DOCUMENTS

| | | | |
|---|---|---|---|
| 1,718,252 | 6/1929 | Putnam | 339/22 R X |
| 3,195,698 | 7/1965 | Codrea | 189/34 |
| 3,289,368 | 12/1966 | Mark | 52/220 |
| 3,377,756 | 4/1968 | Polhamus | 22/220 |
| 3,418,765 | 12/1968 | Propst et al. | 52/36 |
| 3,566,566 | 3/1971 | Janic | 52/221 X |
| 3,759,297 | 9/1973 | Anderson et al. | 138/156 |
| 4,056,297 | 11/1977 | Gartung | 339/23 |
| 4,203,639 | 5/1980 | VandenHock et al. | 339/22 R |
| 4,232,183 | 11/1980 | Person | 52/221 X |
| 4,255,610 | 3/1981 | Textoris | 174/48 |
| 4,375,010 | 2/1983 | Mollenkopf | 174/48 |
| 4,375,829 | 3/1983 | Dorr et al. | 160/135 |
| 4,382,648 | 5/1983 | Propst et al. | 339/22 R X |
| 4,422,385 | 12/1983 | Rutsche et al. | 108/153 |
| 4,423,573 | 1/1984 | Omholt et al. | 52/145 |
| 4,535,577 | 8/1985 | Tenser et al. | 174/48 X |

Primary Examiner—Stuart S. Levy
Assistant Examiner—Lynn M. Sohacki
Attorney, Agent, or Firm—Varnum, Riddering, Schmidt & Howlett

[57] ABSTRACT

A work space management system for dividing a room into separate work areas comprising a wall system having a rigid framework formed of rigid rectangular frames rigidly joined together at the edges thereof to form at least one work area, wire management elements secured to the frames for communication and power wiring and a plurality of modular panels removably hanging on the frames. At least some of the wire management elements are secured to the bottom or baseline of the frames and at least some of the wire management elements are removably secured to a waistline or midportion of at least some of the frames. In some cases, the frames only extend to a waist height and in other cases, the frames extend to a full panel height. The panels are sized to fit between the waistline wire management elements and the baseline wire management elements to substantially cover the frames therebetween. The work management system provides an architectural wall system with flexibility for interchangeable panels for different decorative effects as well as functional features. The panels can be fabric or vinyl covered, or can comprise acoustical panels, window panels, work-in-process panel rails or lighting panels.

35 Claims, 9 Drawing Figures

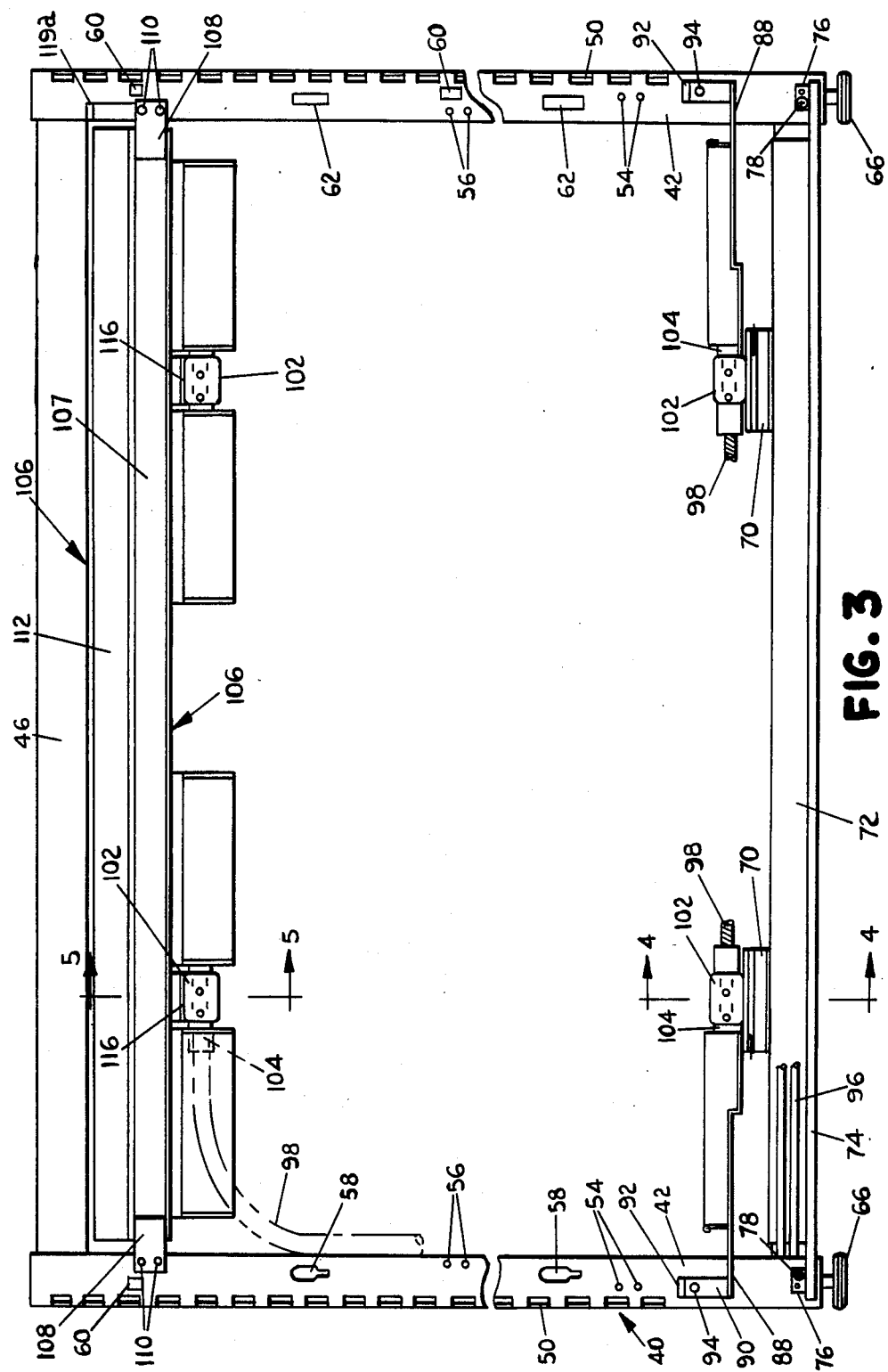

WORK SPACE MANAGEMENT SYSTEM

TECHNICAL FIELD

This invention relates to work space management systems. In one of its aspects, the invention relates to a work space management system wherein walls are easily constructed, configured and changed, and wherein convenient electrical and communication access channels are easily installed and movable for ease of set-up and change of systems, and wherein wall covering panels and work tools are easily configured and changeable without interferring with the underlying rigid frame structure.

BACKGROUND ART

Open-plan office systems, pioneered by Herman Miller, Inc., more than fifteen years ago, provide a series of rigid panels which in turn are rigidly connected together at facing edges to divide work spaces into work or task areas. The panels are quickly and easily coupled together at facing edges for straight line, angled coupling or multiple wall coupling. Vertical slots are provided at the facing edges to support brackets for hanging cabinets, shelves and work surfaces to efficiently use the space. Examples of such wall panel systems are disclosed in the following U.S. patents:

Propst et al, U.S. Pat. No. 3,418,765, issued Dec. 31, 1968;
Propst et al, U.S. Pat. No. 3,430,997, issued Mar. 4, 1969;
Beckman, U.S. Pat. No. 3,449,887, issued June 17, 1969;
Propst et al, U.S. Pat. No. 3,517,469, issued June 30, 1970.

In these and other currently popular panel systems, the panels are preassembled and covered at the factory with a fabric or a vinyl covering. Acoustical panels are also preassembled at the factory. These panels must be professionally installed and arranged. Although the panels are easily changed to change configuration, such changing must be done professionally. Once the color scheme is set, it cannot be changed without returning the panels to the factory or otherwise sending the panels out for recovering. Thus, the panel colors are ordinarily not changed.

Electrical systems were later provided as an addition to the panels. Typically, the electrical systems are provided underneath the panels and are not integrated with the panels. In some cases, the electrical system is removably secured through the slotted hanging intelligence in the panel frames. Examples of electrical systems used with panels are disclosed in the following U.S. patents:

Propst et al, U.S. Pat. No. 4,382,648, issued May 10, 1983;
Propst et al, U.S. Pat. No. 4,257,203, issued Mar. 24, 1981;
Propst et al, U.S. Pat. No. 4,255,611, issued Mar. 10, 1981;
Propst et al, U.S. Pat. No. 4,235,495, issued Nov. 25, 1980;
Propst et al, U.S. Pat. No. 4,231,630, issued Nov. 4, 1980;
Propst et al, U.S. Pat. No. 4,043,626, issued Aug. 23, 1977;
Textoris, U.S. Pat. No. 4,255,610, issued Mar. 10, 1981;
Gartung, U.S. Pat. No. 4,056,297, issued Nov. 1, 1977;
Haworth et al, U.S. Pat. No. 4,277,123, issued Mar. 7, 1981;
VandenHoek et al, U.S. Pat. No. 4,203,639, issued May 20, 1980;
Anderson et al, U.S. Pat. No. 3,759,297 issued Sept. 18, 1983.

Because of the preassembled factory construction, the electrical outlets are provided at the baseline of the panels. Electrical wiring must be run up from the base line to the service area on the outside of the panels. Ordinarily, internal wiring on a selective basis is not possible without custom manufacturing. Even with custom manufacturing, changes cannot be implemented. Utility channels for wiring have, in some cases, been hung onto panels, for example, as shown in Anderson et al.

Attempts have been made to treat these problems in the past. Palhamus in U.S. Pat. No. 3,377,756, issued Apr. 16, 1968, discloses a demountable partition construction in which aluminum channels are joined together to provide a framework. The channels have hollow interiors with snap-fit covers and a removable flange to retain the panels within the flanges. Convenience outlets can be provided in the wall panels in conventional fashion.

Door et al in U.S. Pat. No. 4,375,829, issued Mar. 8, 1983, discloses a framing system for displays, but otherwise similar to Palhamus. H-shaped channels are joined together at the ends thereof through L-shaped fasteners like a picture frame. The frames can be arranged vertically, one above the other, with a horizontally oriented tubular joiner therebetween. Panels can be attached to the framework through Velcro fasteners. Electrical power is supplied to the frame through a power plug at the top of the frame.

More recently, several manufacturers of openplan systems have offered a replaceable acoustical panel for a rigid metal frame. An example of one such system is shown in U.S. Pat. No. 4,423,573, issued Jan. 3, 1984.

Although the open-plan system remains a viable solution for many office environments, some business organizations have functional and esthetic requirements which cannot be practically or commercially met by the open-plan system. These new requirements are driven in large measure by the increasing use of computer equipment in the office, by the increasing frequency with which work teams and processes change, by ergonomics of the new computer-driven work place and by new standards regarding personal and human-sensitive work places throughout all levels of the business environment.

As computer technology spreads throughout the office, there is an increasing need to link a diverse range of users with electronic equipment and data bases. This need is solved by a local network of communication wiring which must be easy to install, adaptable to change with a minimum of effort and must be delivered to individual users at a convenient location. The current open-plan system does not meet this need.

Due to rapidly changing business conditions, work teams and work processes change much more rapidly than in the past. The physical environment must be capable of supporting these changes quickly and easily. The office space-management system must be easy to manage in terms of specification, design and installation.

The current open-plan system does not meet these needs.

The inflexibility of computer terminals and peripheral equipment puts a greater demand on the physical environment to meet the postural, visual and social needs of the office workers. Many office tasks which were once accomplished by moving or walking about, the through face-to-face meetings with other workers, are now handled by the video display terminal. Individual control over lighting, operator positioning and balance between privacy and communication is important to psychological comfort and productivity. Thus, a modern video display terminal (VDT)-containing work station must adjust to the physical as well as psychological needs of the individual worker and serve as a buffer between him or her and the inflexible computer hardware. The current open-plan office system does not adequately meet these needs.

While fine finishes and materials have long been associated with the senior management level, there is a trend away from bland institutional environments and toward more personal and human-sensitive work places throughout different levels of the business organization. Changing corporate values of a more participative management style, as well as the growing importance and power of the white-collar worker, also contribute to the increasing demand for customized or user-influenced work environments. Customization has heretofore required special processing which is costly and lengthy for both customers and manufacturers. Thus, current open-plan systems do not respond to these needs.

DISCLOSURE OF INVENTION

According to the invention, a work space management system is provided for dividing a room into separate work areas. The wall system comprises a rigid framework formed of rigid rectangular frames rigidly joined together at the edges thereof to form at least one work area. Wire management means are provided for enclosing communication and power wiring. At least some of said wire management means are secured to the bottom or baseline of said frames and at least some of the wire management means are removably secured to a waistline or midportion of at least some of the frames. In some cases, the frames only extend to waist height and in other cases, the frames may extend to a full panel height. Electrical and/or communication wiring extends between at least some of the baseline wire management means and the waistline wire management means. A plurality of lower panels are sized to fit between the waistline wire management means and the baseline wire management means to substantially cover the frames therebetween. Means are provided for removably securing the lower panels to the frames between the waistline and baseline wire management means and in substantially coplanar relationship therewith. The waistline wire management means removably secured to the frame permit relative ease of mounting and demounting of the waistline wire management means to and from the frames at the point of installation.

The baseline wire management means includes a baseline cover forming the outer face of the baseline wire management means and an electrical receptacle accessible by means of the baseline cover to provide an electrical outlet for the work space. Similarly, the waistline wire management means includes a waistline cover forming an outer face of the waistline wire management means and an electrical receptacle accessible by means of the waistline cover to provide an electrical outlet for the work space.

The invention thus provides a flexible and adaptable wall panel system in which wiring is selectively provided at the baseline and/or at the waistline. Typically, the frames have a plurality of vertical slots at the edges thereof and brackets fit in the slots for supporting work surfaces and cabinets. The waistline wire management means provides for electrical and/or communication wiring at the work surfaces as desired.

Some of the waistline wire management means are secured to a midpoint of the frames and there are provided a plurality of upper panels sized to fit between the waistline wire management means and an upper edge of the frames to substantially cover the frame at upper portions thereof. Means are provided for securing the upper panels to the frames at the upper portions thereof. In some cases, no waistline wire management means are necessary and the upper panels are sized to fit between the lower panels and the upper edge of the frames to substantially cover the frames. Once again, the upper panels are removably secured to the frames. The removable securing of both the wire management means and the panels to the rigid frames permits customizing of any office environment with a minimum of effort. Acoustical panels, window panels and hard-surface panels can be selected as desired to fit the particular needs. Further, because of the segmentation between the upper and lower panels, more expensive acoustical panels can be selected for the upper portions of the frames and less expensive, non-acoustical panels can be provided at the lower portions of the frame. The removability of the panels on the frames permits the decor to be changed without changing the entire frame and panel.

The wire management means have an elongated conduit chase which is removably secured at the ends thereof to the edges of the frame. A cover, sized to cover the chase, is mounted to the chase or frame and securable to the chase in a snap-fit relationship. The removability of the wire management at the waistline frame portion allows the user to first customize the work area and make changes as desired. Thus, a full waistline wire management conduit on all panels or dedicated panels with waistline wire management is unnecessary.

The wire management means and the panels are designed so that the wire management covers are flush with the panels, thereby giving an integrated appearance to the entire panel. The wire management means has means for passing the wires from frame to frame outside of the frame structure itself. Covers are provided to removability fit between the chase covers to cover the wires which extend from one wire management means to the next around the frame edges.

BRIEF DESCRIPTION OF THE DRAWINGS

The invention will now be described with reference to the accompanying drawings in which:

FIG. 3 is an elevation view of a frame with electrical and communication service wiring;

BEST MODE FOR CARRYING OUT THE INVENTION

Figure 1:
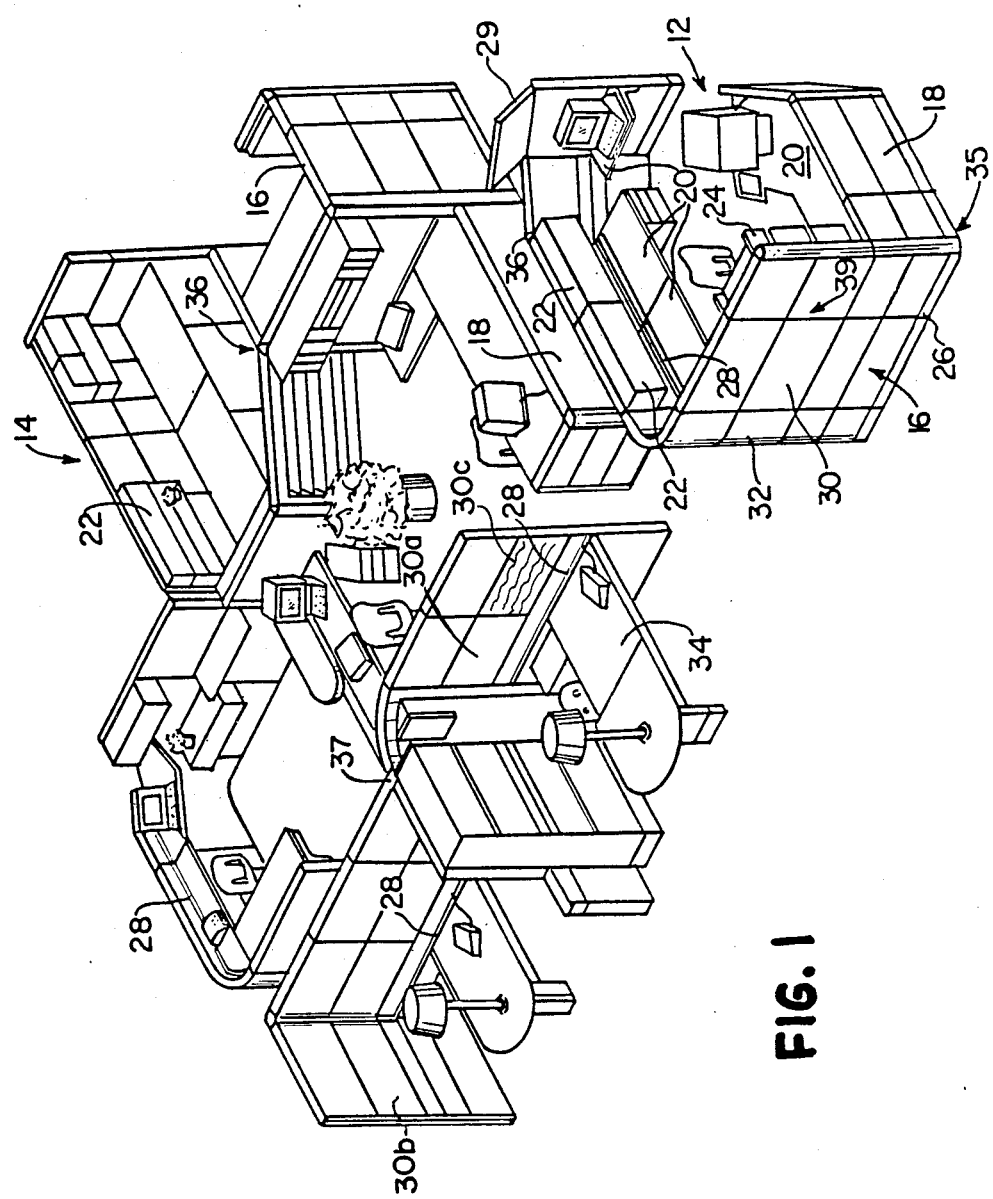
FIG. 1 is a perspective view of an office environment showing a wall panel system according to the invention.

Referring now to the drawings and to FIG. 1 in particular, there is shown an office environment having a single work station 12 and a multiple work station 14. Full-size walls 16 and short walls 18 define the single work station. Work surfaces 20 are mounted on the walls 16 in cantilevered fashion. Hanging cabinets 22 and shelves 24 are also supported by the walls 16. The walls are formed from straight panel sections 30 and curved panel sections 32. A baseboard wire management assembly 26 is provided at the base of each of the walls and a waistline wire management assembly 28 is provided at a midpoint in the walls in selected locations. A slanted panel 29 having an acoustical material is provided as an extension to one portion of the walls 16. A panel 30a can have a hard surface for a marker or chalk board. A panel 30b comprises a translucent panel with a source of illumination (not shown) behind it to provide a source of illumination. A panel 30c can have a wood veneer surface thereon.

The multiple work station 14 is of similar nature and is formed by full-size walls 16 and short walls 18 which are interconnected. Work surfaces 20, hanging cabinets 22 and shelves 24 are also provided on these walls. In addition, both baseboard wire management assemblies 26 and waistline wire management assemblies 28 are provided in selected locations. A table 34 can be partially supported by the walls and have an outboard support beneath the outer end thereof. Ninety-degree joints 35, 120° joints 36 and T-wall connections 37 are formed between various panels as desired. Further, straight-wall connections 39 are formed between both straight-wall and curved-wall sections.

Figure 2:
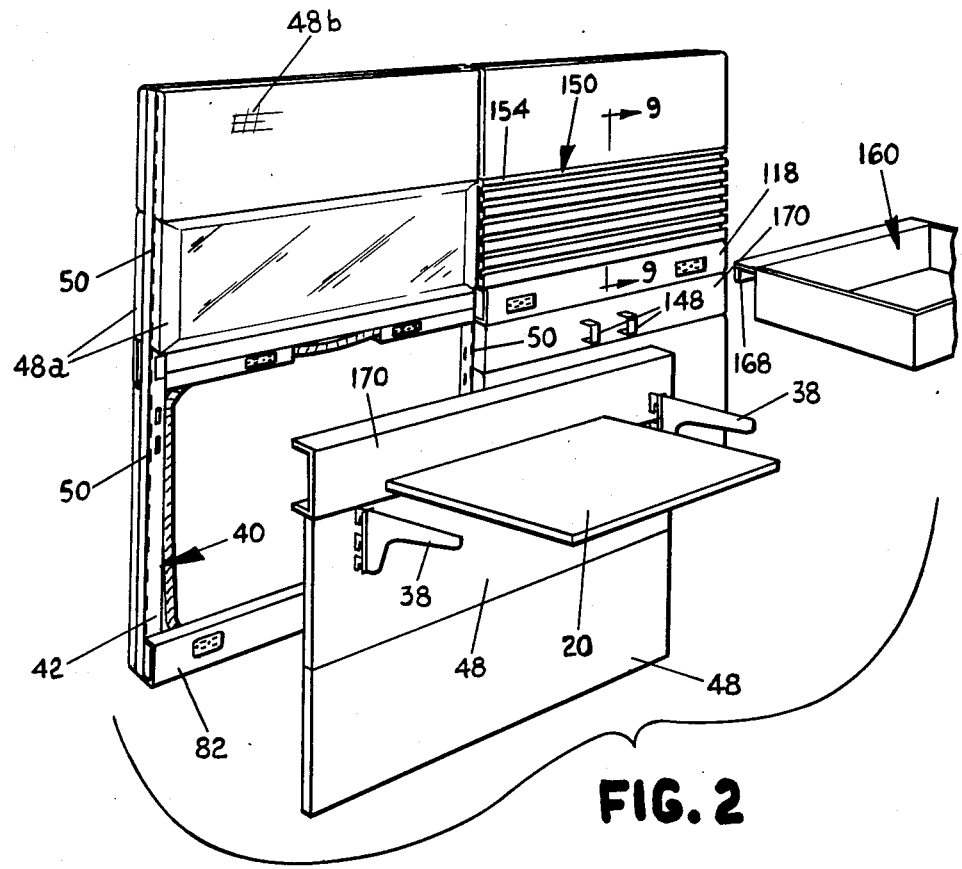
FIG. 2 is an exploded perspective view of a wall panel assembly.
Figures 4, 9:
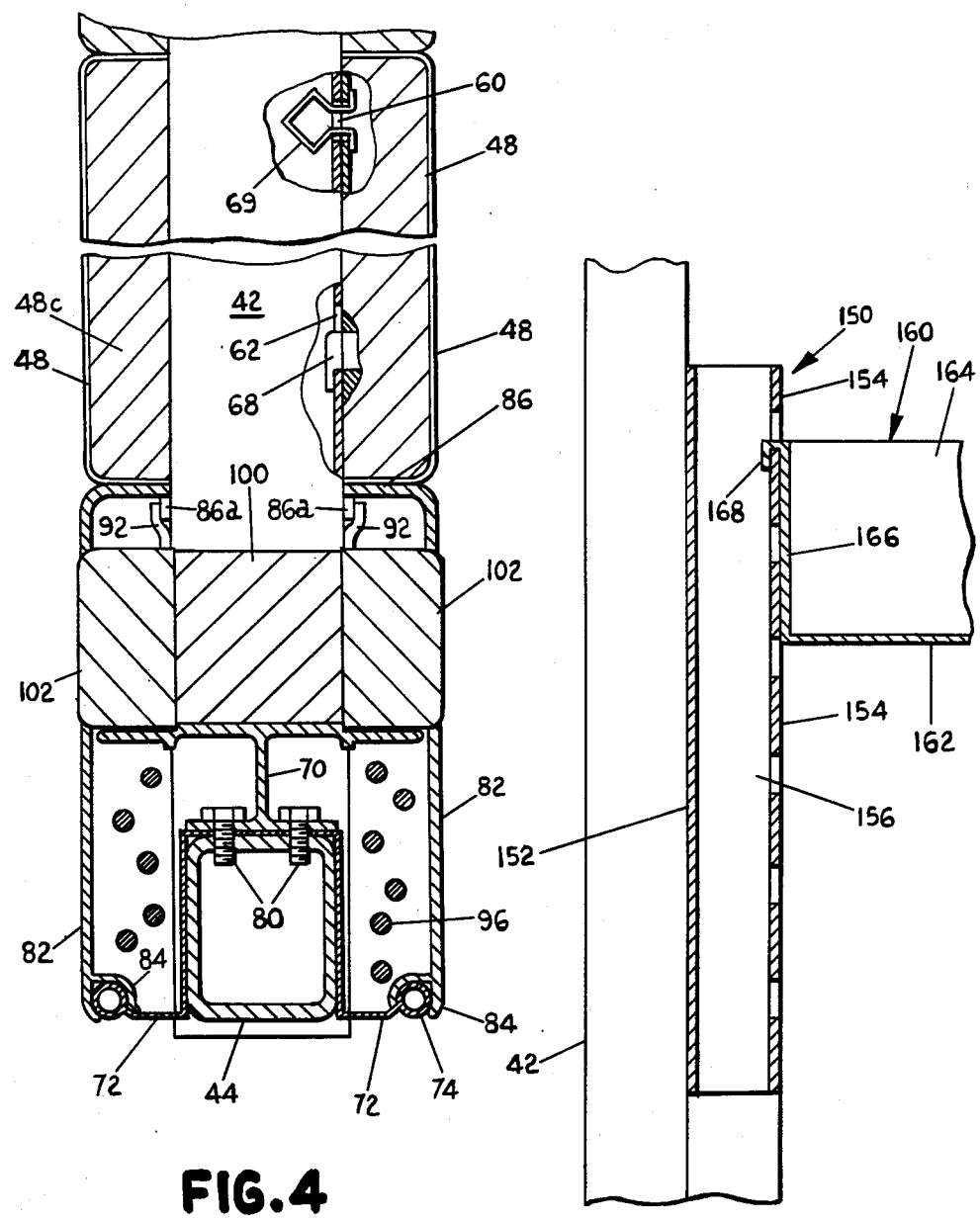
FIG. 4 is a sectional view taken along lines 4—4 of FIG. 3.
FIG. 9 is a sectional view taken along lines 9—9 of FIG. 2.

Referring now to FIGS. 2 and 3, there is shown a frame 40 comprising a pair of identical vertical members 42 welded to horizontal members 44 and 46. The underlying frame need not have a furniture grade finish and can be formed by roll-forming or other suitable metal-forming techniques. Equal-size panel outserts 48 are removably secured to the frame 40. The term "outsert" is used to designate removable panels or tiles which hang on the outside surface of the frame 40, thereby leaving the interior of the frame open. Each of the panel outserts 48 is of identical size and shape but may have different outer surfaces or may have acoustical treatment in an interior thereof. For example, the outer surface of the outserts 48 may be covered with a fabric 48b or vinyl material or wood veneer, or could even be painted. The panel outserts can be formed from a metal pan, turned inwardly at the edges and covered or painted as desired. Insulation 48c can be provided within the metal pan as shown in FIG. 4, if desired.

Typically, the outserts 48 have a height of about 16" and a width substantially the width of the frame 40 which can vary between standard widths.

The panel outserts 48 can also take the form of a clear panel and thus be glazed or constructed of plexiglass as, for example, panel 48a as shown in FIG. 2. A trim segment can be attached to interior steel frame to enable pass-through access from one side of the panel to another. If desirable, a clear panel of glass or plastic can be placed between the trim segments to make a window.

Vertical rows of slots 50 are provided on the outside corners of each of the vertical members 42 to receive standard brackets 38 with clips for supporting the work surfaces 20, the hanging cabinets 22 and the shelves 24. Pairs of screw holes 54 and 56 are provided in spaced relationship along the height of the vertical members 42. Keyhole slots 58 are provided on one side of the vertical members 42 and square openings 60 are provided above the keyhole slots 58 in spaced relationship thereto. Rectangular openings 62 are provided on the other side of the vertical members 42 in juxtaposition to the keyhole slots 58. Square openings 60 are also provided above the rectangular openings 62. A weld nut (not shown) is secured underneath the frame on the horizontal member 44 and an adjustable foot 66 is threaded into the weld nut to adjust the height of the panel sides.

Referring to FIGS. 3 and 4, an I-shaped bracket 70 is secured to the top of the horizontal member 44 through rivets or bolts 80. An elongated chase 72 is captured between the I-shaped bracket 70 and the horizontal member 44. The elongated chase 72 extends across the top and down along each side of the horizontal member 44, extending outwardly thereof and defining a hinge-forming tube 74 at the outer end thereof. The hinge-forming tube 74 extends laterally in overlapping relationship to the vertical members 42 and has attaching flange 76 with holes in registry with the frame screw holes (not shown). Screws 78 extend through the flange 76 and are tapped into the frame screw holes to secure the ends of the hinge-forming tube 74 to the frame 40.

A hinged cover 82 has socket-forming flanges 84 at the bottom portion thereof which receive the hinge-forming tube 74 to pivotably mount the hinged cover 82 to the elongated chase 72. An inwardly directed flange 86 at the top of the hinged cover 82 fits beneath the panel outserts 48 and extends to the frame 42. A cover retainer 88 extends laterally from the elongated chase 72 and has an upwardly-extending end flange 90 with a retainer 92 at the top portion thereof. A screw 94 extends through a hole in the end flange 90 and into a screw hole 54 to secure each end flange 90 to a vertical member 42. The inwardly directed flange 86 has a downwardly-extending projection 86a which is snap-fit with the retainer 92 to hold the hinged cover 82 in place in front of the elongated chase 72. Alternately, the cover 82 can have a projecting prong with an upwardly-extending lip at the sides of the cover. The frame 40 can have horizontal slots on the vertical members 42 in registry with the prongs to releasably retain the cover in closed position. The hinged cover 82 also has a hinged access cover 95 (FIG. 6) at spaced locations therealong to provide an opening for communication cabling to pass therethrough.

Communication wiring 96, including telephone and computer wiring, is laid in the elongated chase 72 behind the hinged cover 82. A flat electrical cable or festoon 98 extends through the upper portion of the elongated chase 72 and is connected to an energy distribution block 100 through a connector 104. A convenience outlet 102 can be plugged into the energy distribution block 100. As seen in FIG. 4, the convenience outlet 102 extends out through an opening in the hinged cover 82 for direct access of electricity.

Figure 5:
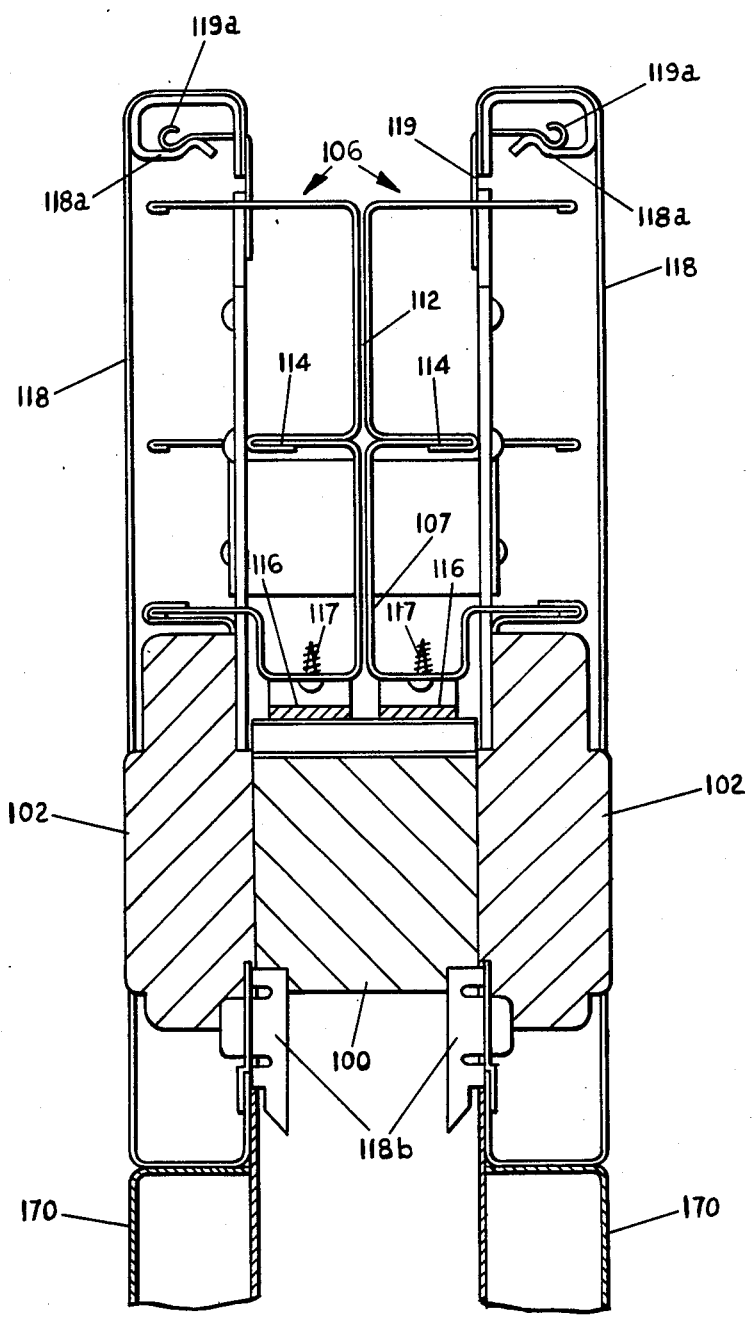
FIG. 5 is a sectional view taken along lines 5—5 of FIG. 3.

Referring now to FIGS. 3 and 5, waistline service chase 106 has a lower section 107 and an upper section 112. A bracket 108 is secured to the lower section 107 and is secured to the ends of the midpoint of the frame through screws 110. A cover-retaining flange 119 extends upwardly from the bracket 108 and forms an outwardly-extending spring retainer 119a at an upper end thereof. The upper section 112 is secured to the lower section 107 through crimped flanges 114. A U-shaped mounting bracket 116 is secured to the lower section 107 through screws 117 and mounts a double-sided energy distribution block 100 through screws (not shown). The upper and lower sections of the beltline service chase 106 form open sided U-shaped channels to provide a channel for communication wiring above a work surface. A flat electrical cable or festoon 98 is positioned beneath the waistline chase 106 and connects to the energy distribution block 100 through a connector 104. As in the baseline energy distribution system, a convenience outlet 102 can be plugged into the energy distribution block 100. As seen in FIG. 5, the waistline service chase 106 is sufficiently narrow to allow two of such chases in back-to-back relationship. However, a waistline service chase need not be secured in back-to-back relationship and typically will not be. In the typical case where only one waistline service chase is provided on a frame, the energy block 100 can be somewhat narrower and a panel outsert is provided on the opposite side of the frame in lieu of the waistline wire management assembly 26.

A cover 118 has a flat outer face with openings aligned with convenience outlets 102. The cover extends rearwardly a top and bottom portions. A U-shaped retaining clip 118a is mounted to the upper, outer portion of cover 118 in registry with the spring retainer 119a. A hook clip 118b is mounted to the lower, outer portions of cover 118 in registry with a keyhole slot 58 on one frame vertical member 42 and with a square opening 60 on an opposite frame vertical member 42. The hinge cover 118 is mounted to the frame vertical members through the hook clips 118b at the bottom and through the U-shaped retaining clips 118a at the top thereof.

A half-panel outsert 170 is mounted to the frame 40 beneath the waistline wire management assembly 26 and above the lower panel outsert 48. The half-panel outsert is typically of the same finish as the cover 118 and can be mounted to the frame in the same manner as the panel outserts 48. The half-panel outsert 170 and the cover 118 together have a size equal to a full-panel outsert 48 and, in effect, together form a full panel outsert.

The manner of removably securing the panel outserts 48 to the frame 40 is shown in FIG. 4 in which the vertical frame member 42 and the panel outsert 48 are partially broken away. Each panel outsert 48 has a pair of hook-shaped clips 68 secured to a bottom portion thereof in spaced relationship. The clips 68 project rearwardly from the panel 48 and are located to register with a keyhole slot 58 and a rectangular opening 62. The panel outsert 48 further has mounted thereto a pair of rearwardly projecting spring clips 69 which are spaced to register with a set of square holes 60 in the frame vertical members 42. The spring clips 69 are flexible in a vertical direction to squeeze through the square holes 60 and lodge behind the edges of the opening 60 as illustrated in FIG. 4. Thus, the panel outserts are easily mounted on the frame by placing the hook-shaped clips 68 in the keyhole slot 58 and rectangular opening 62 while tilting the panel 48 outwardly so that the slot 58 and opening 62 are visible during this operation. The panel is then rotated upwardly until the spring clips 69 pass through and are lodged behind the openings 60. The panel outserts are easily removed by following the reverse procedure. The novel system of mounting the outserts to the frame permits the outserts to be removed independently without removal of adjacent or higher or lower panels. Yet. precise spacing is maintained between all panels.

Figure 6:
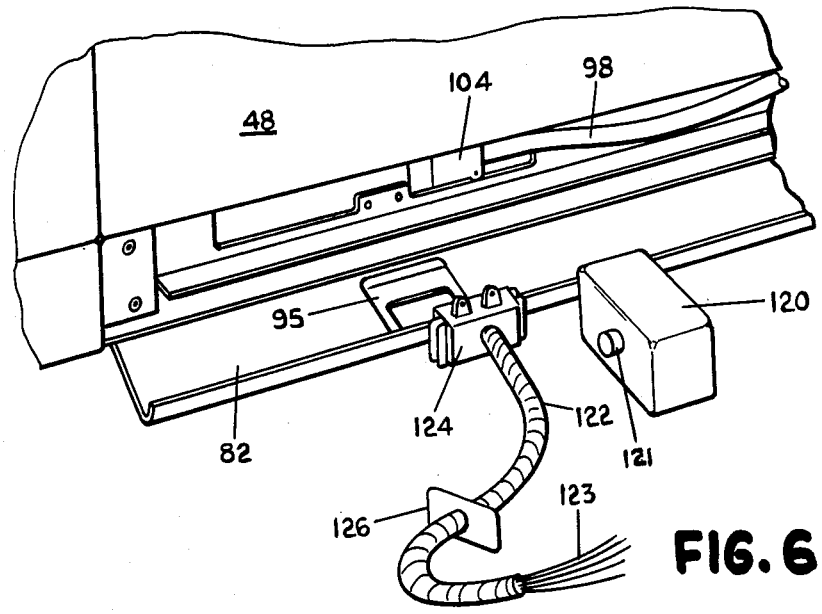
FIG. 6 is a perspective view of a bottom of a panel showing the electrical service to the panel through a monument.

Referring now to FIG. 6, a monument 120 has an outlet opening 121. A flexible cable 122 having wires 123 extends into the opening 121 at one end thereof and is connected at the other end thereof to a power block 124. The power block 124 is positioned behind an opening in the access cover 95 of the hinged cover 82 and a filler plate 126 covers the opening in the access cover 95.

Figure 7:
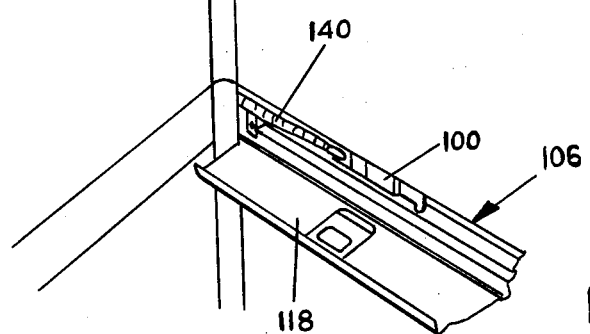
FIG. 7 is a perspective view showing the introduction of electrical service through the ceiling and power pole.

Referring now to FIG. 7, there is shown a ceiling grid work 130 which supports ceiling panels 132. An opening 134 is provided in a ceiling panel 132 and a power-pole conduit 142 extends through the opening 134 and down through the corner of walls 16. An electrical conduit 136 supplies electricity of a junction box 138. A flexible conduit 140 carries electrical wire down through the power-pole conduit 142 and beneath the waistline chase 106. The electrical wire is connected to the energy distribution block 100 beneath the chase 106.

Figure 8:
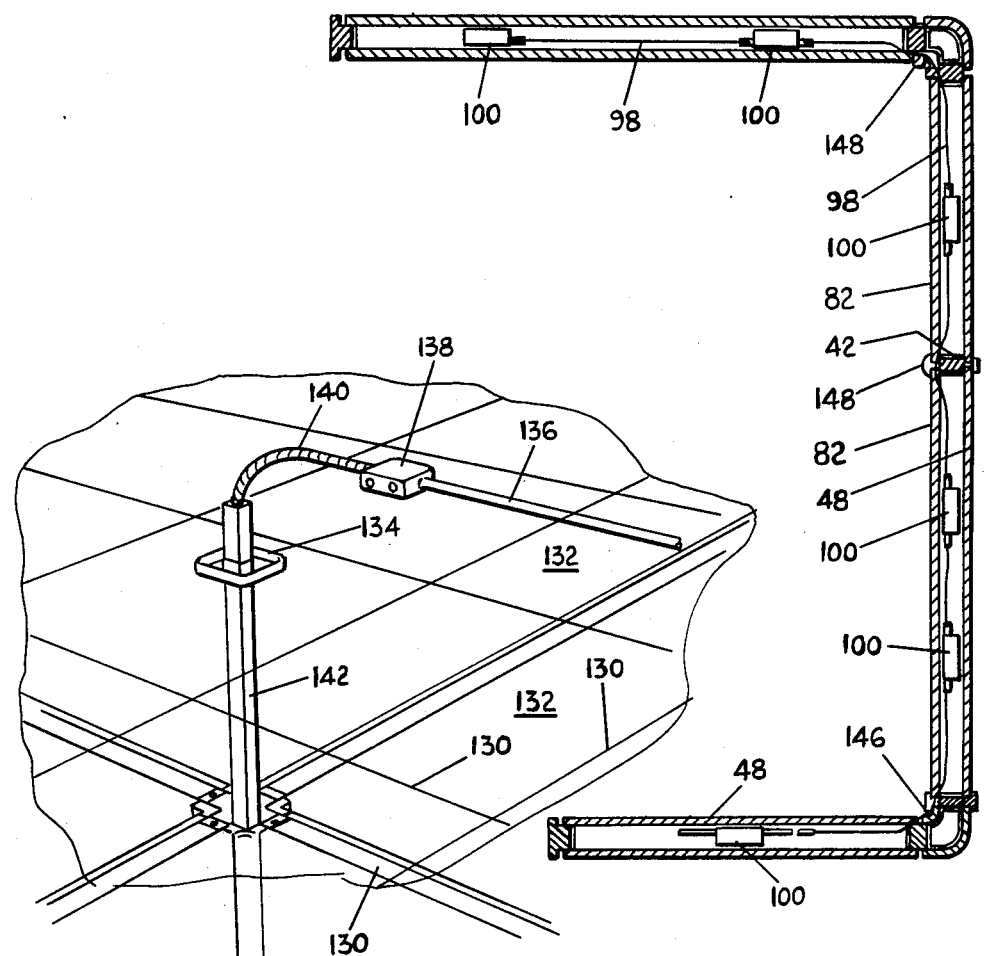
FIG. 8 is a schematic view of a horizontal section through a wall panel at the beltline showing the manner in which electrical and cabling pass from panel to panel.

Referring to FIG. 8, there is shown a schematic view of a cross-section through a U-shaped wall section at a baseline thereof. The cross-section through a waistline would be similar. The electrical cableing 98 is shown passing around the vertical frame members 42 at the edges of the panel but behind the cover 82. The electrical cabeling also passes around the corners at the inside corners thereof and is covered by a corner cover member 146. Flexible covers 148 extend between the chases to cover the wiring therebetween. The covers 148 are U-shaped and are removably secured to the covers 82 (and to waistline covers 118) through a snap-fit connection to be flush therewith.

The frames are rigidly connected together to form either straight lines or curved configurations. Any suitable frame-joining technique can be used. Examples of suitable techniques for joining the frames together are disclosed in the Propst et al U.S. Pat. Nos. 3,430,997 (issued Mar. 4, 1969) and 3,425,171 (issued Feb. 4, 1969). These patents are incorporated herein by reference.

Referring now to FIGS. 2 and 9, there is shown a WIP rail outsert. The rail is used to support various work-in-process (WIP) articles such as trays 160. The rail outsert 150 has a plurality of horizontal rails 154 for mounting work-in-process items such as trays 160 through depending hooks 168. As seen in FIG. 9, the WIP rail outsert has a back wall 152, a front wall spaced from the back wall 152 and formed by a plurality of horizontal rails 154. Side walls 156 connect the back wall 152 thorugh the horizontal rails 154. The tray 160 is of conventional shape and has a bottom wall 162, side walls 164, a back wall 166 and a depending hook 168 integrally formed with the back wall 166. The tray 160 is easily positioned on the rails by inserting the hook 168 through an opening between adjacent rails 154 and dropping the tray downwardly so that the hook 168 engages the rail 154. The back wall 166 abuts several rails 154 for stability.

In addition to the panel outserts 48,48a and rail outsert 150, panel outserts can take othre forms. For example, the outserts can have translucent panels in lieu of clear panels and have lighting behind the panels to provide a lighted panel surface. Alternatively, the panels can be formed as a screen or CRT display unit with appropriate technology. The panels can be covered with a wood veneer as well as fabric or vinyl. A panel outsert could be formed of a marker board or a chalk board material. All of these different surfaces are easily constructed and relatively inexpensive to build. They provide the individual user with complete flexibility in design of his or her own work station to fit the tasks as well as to fit the personality of the worker. These options can be selected without special ordering or long delays. Further, when people are shifted from locations, the panels can be moved easily to a new location and/or the old location can be easily changed to accommodate the personality and tasks of the new occupant. The walls can also be easily shifted but in any case the panel outserts can be changed by personnel themselves or with relatively unskilled labor. Since all of the panel outserts are of a modular size, they are interchangeable and special sizing is not required. Further, the basic underlying frame need not be disturbed during changing of the panel outserts.

The wire management and panel outserts are flush with one another to give a clean surface appearance. Yet the flexibility of the wire management allows the wire management to be added at waistline or taken away with great simplicity.

The concept of hanging the panels onto the frames provides a system for inexpensively manufacturing the wall system, yet the wall system has the appearance of an architectural wall, that is, a wall which has been constructed in the conventional fashion with studs. Further, the thickness of the wall and the outsert panels allows wiring to be passed through from wall section to wall section around the frame without the necessity of feeding the wires through the frames. This lay-in capability is important in changing the communications and electrical wiring quickly and easily with relatively unskilled labor.

Thus, the work-space management system according to the invention provides an easy means for linking a diverse range of office workers with electronic equipment and data bases. The flexibility of the wire management, both at the base line and selectively at the waistline with lay-in capabilities and wiring around the frames, provides this ability. As indicated, the lay-in capabilities provide for an ease of installation, adaptability of change with a minimum of effort and the communication wiring is delivered at a convenient location, i.e. at work height.

The ease of removability of the outsert partitions as well as the modularity of the panel outsert and the variety of the same provides a way to manage the office space system in terms of specification, design and installation. The variety and modularity of the panel outserts as well as the ease with which these outserts are installed and removed from the rigid frames provide a solution to meeting individual needs in work areas and a balance between privacy and communication. The invention provides a way in which a modern VDT-containing work station can easily adjust to the physical as well as psychological needs of the individual worker and serve as a buffer between him or her and inflexible computer hardware.

Finally, the invention provides a way in which each work station can be customized to individual needs on a convenient and economical basis. The panel outserts are relatively inexpensive to construct and to order and can be easily changed.

Reasonable variation and modification are possible within the scope of the foregoing disclosure and drawings without departing from the spirit of the invention which is defined in the appended claims.

The embodiments of the invention in which an exclusive property or privilege is claimed are defined as follows:

1. A work space management system for dividing a room into separate work areas comprising:
   a rigid framework formed of rigid rectangular frames rigidly joined together at the edges thereof to form at least one work area;
   baseline wire management means for enclosing communication and/or power wiring secured to a base of at least some of said frames, said baseline wire management means including a baseline cover forming an outer face of said baseline wire management means and an electrical receptacle accessible by means of said baseline cover to provide an electrical outlet for said work space;
   waistline wire management means for enclosing communication and/or power wiring, said waistline wire management means including a cover forming an outer face of said waistline wire management means and an electrical receptacle accessible by means of said waistline cover to provide an electrical outlet for said work space;
   means for removably mounting said waistline wire management means to at least some of said frames at a working height well above the base thereof, said removable mounting means permitting relative ease of mounting and demounting said waistline wire management means, respectively, to and from said frames at the point of installation;
   electrical and/or communication wiring extending between at lease some of said baseline wire management means and said waistline wire management means;
   a plurality of lower panels sized to fit between said waistline wire management means cover and said baseline wire management means cover to substantially cover said frames therebetween; and
   means for removably securing said lower panels to said frames between said waistline and said baseline wire management means covers and in substantially coplanar relationship therewith.

2. A work space management system according to claim 1 wherein at least some of said waistline wire management means are secured to a midpoint of said frames, and further comprising a plurality of upper panels sized to fit between said waistline wire management means covers and an upper edge of said frames to substantially cover said frame at upper portions thereof; and means for removably securing said upper panels to said frames at said upper portions thereof in substantially coplanar relationship to said waistline wire management means covers.

3. A work space management system according to claim 1 wherein at least some of said frames have no waistline wire management means on at least one side of said frames and further comprising a plurality of upper panels sized to fit between said lower panels and an upper edge of said frame and substantially covering the same; and means for removably securing said upper panels to said frames at upper portions thereof.

4. A work space management system according to claim 3 wherein at least some of said upper panels have acoustical sound-deadening material therein.

5. A work space management system according to claim 4 wherein at least some of said panels are clear panels to provide windows in said panels.

6. A work space management system according to claim 4 wherein at least one of said panels has a plurality of spaced horizontal rails for releasably holding work-in-progress utensils.

7. A work space management system according to claim 4 wherein at least one of said panels comprises a translucent panel with an illumination source behind the translucent panel to provide a source of illumination.

8. A work space management system according to claim 4 wherein at least one of said panels comprises a hard surface providing a marker or chalk surface.

9. A work space management system according to claim 2 wherein said waistline wire management means comprises an elongated U-shaped conduit chase secured at the ends thereof to the sides of the frame with the legs of the U being substantially horizontal and having means for positioning communication and electrical wiring therein; and said cover is sized to cover said conduit chase and is removably mounted to said conduit chase for ready access to said conduit chase.

10. A work space management system according to claim 9 wherein said waistline wire management means cover has an opening therein and said electrical receptacle is electrically coupled to electrical wiring in said chase and projects through said cover opening.

11. A work space management system according to claim 10 wherein said wire management means have means to run wires from frame to frame externally of said frame edges; and means flush with said wire management means covers to removably cover said wires between said wire management means on said frame edges.

12. A work space management system according to claim 11 wherein said rectangular frames have a substantially open central portion and said electrical and/or communication wiring extends between said lower panels and within the open central portion of said frame.

13. A work space management system according to claim 12 wherein each of said rectangular frames has a plurality of vertically-extending slots on each end thereof and said upper and lower panels cover said frame up to said slots; at least some of said frames have brackets removably mounted in said slots; and work surfaces supported by at least some of said brackets.

14. A work space management system according to claim 13 and further comprising cabinets supported by at least some of said brackets.

15. A work space management system according to claim 1 wherein said waistline or baseline wire management means comprises an elongated U-shaped conduit chase secured at the ends thereof to the sides of said frame with the legs of the U being substantially horizontal and having means for positioning communication and electrical wiring therein; and a cover sized to cover said conduit chase and mounted to said conduit chase for ready access thereto.

16. A work space management system according to claim 15 wherein said waistline or baseline wire management means cover has an opening therein and said electrical receptacle is electrically coupled to said electrical wiring in said chase and projects through said cover opening.

17. A work space management system according to claim 16 wherein said wire management means have means to run wires from frame to frame exteriorly of said frame edges; and means flush with said wire management means covers to removably cover said wire between said wire management means and on said frame edges.

18. A work space management system according to claim 16 wherein said rectangular frames have a substantially open central portion and said electrical and/or communication wiring extends between said lower panels within an open central portion of said frame.

19. A work space management system according to claim 18 wherein each of said rectangular frames has a plurality of vertically-extending slots on each end thereof and said lower panels cover said frame up to said slots; at least some of said frames have brackets removably mounted in said slots; and work surfaces supported by at least some of said brackets.

20. A work space management system according to claim 19 and further comprising cabinets supported by at least some of said brackets.

21. A work space management system according to claim 1 wherein said wire management means have means to run wires from frame to frame around said frame edges; and means flush with said wire management means covers to removably cover said wires between said wire management means and on said frame edges.

22. A work space management system according to claim 1 wherein said rectangular frames have a substantially open central portion and said electrical and/or communication wiring extends between said lower panels and within an open central portion of said frame.

23. A work space management system according to claim 1 wherein each of said rectangular frames has a plurality of vertically-extending slots on each end thereof and said lower panels cover said frame up to said slots; at least some of said frames have brackets removably mounted in said slots; and work surfaces supported by at least some of said brackets.

24. A work space management system according to claim 23 and further comprising cabinets supported by at least some of said brackets.

25. A work space management system comprising:
a rigid framework formed of rigid rectangular frames rigidly joined together at the edges thereof to form at least one work area, each of said frames having outer faces and an open interior;
a plurality of modular panel outserts having a common height and a width substantially equal to the width of said rectangular frame at least two said modular panel outserts being mounted to and substantially covering some of said frames and at least three of said panel outserts being mounted to and substantially covering other of said panel outserts;
means for removably mounting said panel outserts to said outer faces of said frames;
at least some of said panel outserts having an outer surface of a fabric or vinyl material;

wire management means for handling electrical and-/or communication wires, said wire management means comprising an open-sided conduit and one of said panel outserts comprising a removable cover over the open side of said conduit;

an electrical receptacle mounted to said conduit and electrically coupled to a source of electrical energy, said receptacle being accesible to a user in said work space by means of said removable cover;

said removable mounting means being adapted to mount and demount said wire management means removable cover to said frames at a base, mid or upper portion of said frame with relative ease at the point of installation, whereby said wire management means can be positioned at various vertical locations of said frame.

26. A work space management system according to claim 25 wherein at least some of said panel outserts are clear panels, rail-containing panels, wood veneer panels, marker-surface or chalk-surface panels or lighted translucent panels.

27. A work space management system according to claim 26 wherein said removable mounting means for said panel outserts other than said wire management means comprise spring clip means cover for removing said panel outserts from said frames by pulling outwardly on said panel outserts.

28. A work space management system according to claim 27 wherein each of said frames has a plurality of vretically-extending slots on each side thereof and said panel outserts cover said frame up to said slots; and further comprising brackets for removably mounting in said slots; and work surfaces, cabinets or shelves for mounting to said brackets.

29. A work space management system according to claim 25 wherein each of said rectangular frames has a plurality of vertically-extending slots on each side thereof and said panel outserts have a width to cover said frame up to said slots; and further comprising brackets for removably mounting in said slots; and work surfaces, cabinets or shelves for mounting to said brackets.

30. A work space management system according to claim 25 and further comprising means for mounting said open-sided conduit to said frames with relative ease at the point of installation.

31. A work space management system for dividing a room into separate areas comprising:

a rigid framework formed of at least two rigid rectangular frames rigidly joined together at side edges thereof, each of said frames having outer faces and an open interior;

wire management means comprising a channel having an outwardly-facing open side mounted to each of said frames at substantially the same height from bottom edges thereof, each of said channels adapted to permit wiring to be laid into said channels through said open side thereof;

first cover means extending between the sides of said frame and removably mounted to said wire management means to removably cover said open side of said channel;

panel outserts mounted to an outer surface of said frames in vertical juxtaposition to said wire management means and in abutting relationship therewith, outer surfaces of said panel outserts being substantially flush with outer surfaces of said cover means when said first cover means is in closed relationship to said channels; and electrical wiring supported by said channels in each wire management means and extending from one of said rectangular frames to the other, said electrical wiring extending around an outer face of said frames and said first cover means.

32. A work space management system according to claim 31 and further comprising second cover means extending between adjacent first cover means to cover said wiring between said adjacent covers.

33. A work space management system according to claim 32 wherein said second cover means are removably mounted to said first cover means.

34. A work space management system according to claim 31 wherein said wiring comprises an electrical distribution block mounted to said channel and a flat cable removably mounted to said distribution block.

35. A work space management system according to claim 31 and further comprising means for removably mounting and panel outserts to the frames at the point of installation.

* * * * *

UNITED STATES PATENT AND TRADEMARK OFFICE
CERTIFICATE OF CORRECTION

PATENT NO.  : 4,685,255
DATED       : August 11, 1987
INVENTOR(S) : JAMES O. KELLEY ET AL It is certified that error appears in the above-identified patent and that said Letters Patent are hereby corrected as shown below:

Col. 7, line 9, after "the" insert --ends of the--.
Col. 7, line 10, delete "ends of the".
Col. 8, line 39, "cableing" should be --cabling--.
Col. 8, line 41, "cover" should be --covers--.
Col. 8, line 42, "cabeling" should be --cabling--.
Col. 12, line 13, "wire" should be --wires--.
Col. 12, line 60, "frame," should be --frames,--.
Col. 12, line 60, after "two" insert --of--.

Col. 13, line 8, "accesible" should be --accessible--.
Col. 13, line 26, before "means" insert --cover--.
Col. 13, line 26, before "for removing" delete "cover".
Col. 13, line 31, "vretically" should be --vertically--.
Col. 14, line 44, delete "and" and insert --the--.

Signed and Sealed this

Twentieth Day of December, 1988

Attest:

DONALD J. QUIGG

Attesting Officer

Commissioner of Patents and Trademarks